(12) United States Patent
Saito

(10) Patent No.: US 11,460,354 B2
(45) Date of Patent: Oct. 4, 2022

(54) TABLE

(71) Applicant: DISCO CORPORATION, Tokyo (JP)

(72) Inventor: Yoshinobu Saito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 588 days.

(21) Appl. No.: 16/546,585

(22) Filed: Aug. 21, 2019

(65) Prior Publication Data

US 2020/0072679 A1     Mar. 5, 2020

(30) Foreign Application Priority Data

Aug. 28, 2018   (JP) .............................. JP2018-159258

(51) Int. Cl.
| | | |
|---|---|---|
| *G01K 11/00* | (2006.01) | |
| *G01K 11/12* | (2021.01) | |
| *B25B 11/00* | (2006.01) | |

(52) U.S. Cl.
CPC ............ *G01K 11/12* (2013.01); *B25B 11/005* (2013.01)

(58) Field of Classification Search
CPC .............................. G01K 11/12; B25B 11/005
USPC ..................................................... 165/11, 11.1
See application file for complete search history.

(56) References Cited

U.S. PATENT DOCUMENTS

| | | | | |
|---|---|---|---|---|
| 3,781,522 A | * | 12/1973 | Borom ................ | C03C 10/0054 219/465.1 |
| 3,781,523 A | * | 12/1973 | Borom .................. | H05B 3/746 219/465.1 |
| 4,983,810 A | * | 1/1991 | Balderson .............. | H05B 3/748 219/544 |
| 6,104,007 A | * | 8/2000 | Lerner .................. | H05B 3/744 126/39 H |
| 9,534,793 B2 | * | 1/2017 | Buñuel Magdalena ..................... | F24C 15/102 |
| 2015/0259124 A1 | * | 9/2015 | Park ...................... | A47J 36/027 219/730 |
| 2019/0323902 A1 | * | 10/2019 | Gao ....................... | G09F 3/0295 |

FOREIGN PATENT DOCUMENTS

| | | |
|---|---|---|
| JP | 2012028541 A | 2/2012 |
| JP | 2015003356 A | 1/2015 |
| JP | 2016213318 A | 12/2016 |
| WO | 2018129054 A1 | 7/2018 |

OTHER PUBLICATIONS

Office Action issued in counterpart German patent application No. 10 2019 212 843.2, dated Apr. 30, 2022.

* cited by examiner

*Primary Examiner* — Daniel A Hess
(74) *Attorney, Agent, or Firm* — Greer Burns & Crain Ltd.

(57) ABSTRACT

A table for heating or cooling a workpiece includes a plate member having a mounting surface for mounting the workpiece and a temperature control unit heating or cooling the plate member. A paint layer is formed on the mounting surface of the plate member, in which when the plate member is not heated or cooled by the temperature control unit and accordingly has a first temperature, the paint layer exhibits a first color, and when the temperature of the plate member is changed by the temperature control unit and the temperature of the mounting surface accordingly becomes a second temperature different from the first temperature, the color of the paint layer is changed to a second color different from the first color.

2 Claims, 5 Drawing Sheets

TABLE

BACKGROUND OF THE INVENTION

Field of the Invention

The present invention relates to a table for heating or cooling a workpiece.

Description of the Related Art

In processing a plate-shaped workpiece such as a semiconductor wafer, a table (hot plate or cooling table) is frequently used to heat or cool a tape attached to the workpiece or heat or cool the workpiece itself (see Japanese Patent Laid-open No. 2016-213318, Japanese Patent Laid-open No. 2015-003356, or Japanese Patent Laid-open No. 2012-028541, for example).

SUMMARY OF THE INVENTION

However, it is difficult to visually determine whether the table is heated, cooled, or at ordinary temperature. Accordingly, it is greatly desirable to improve the table.

It is therefore an object of the present invention to provide a table for heating or cooling a workpiece, in which whether or not a temperature change has occurred on the table can be visually determined.

In accordance with an aspect of the present invention, there is provided a table for heating or cooling a workpiece, including: a plate member having a mounting surface for mounting the workpiece; and temperature control means heating or cooling the plate member, a paint layer being formed on the mounting surface of the plate member, in which when the plate member is not heated or cooled by the temperature control means and accordingly has a first temperature, the paint layer exhibits a first color, whereas when a temperature of the plate member is changed by the temperature control means and the temperature of the mounting surface accordingly becomes a second temperature different from the first temperature, a color of the paint layer is changed to a second color different from the first color.

Preferably, when the temperature of the plate member is changed by the temperature control means and a temperature of the mounting surface accordingly becomes the second temperature, letters having the second color appear on the mounting surface with the paint layer.

Preferably, an additional paint layer is formed on the paint layer formed on the mounting surface, in which when the temperature of the mounting surface becomes a third temperature different from the first temperature and the second temperature, a color of the additional paint layer is changed to a third color different from the first color and the second color.

The table for heating or cooling a workpiece according to the present invention includes a plate member having a mounting surface for mounting the workpiece and temperature control means heating or cooling the plate member. A paint layer is formed on the mounting surface of the plate member, in which when the plate member is not heated or cooled by the temperature control means and accordingly has a first temperature, the paint layer exhibits a first color, whereas when the temperature of the plate member is changed by the temperature control means and the temperature of the mounting surface accordingly becomes a second temperature different from the first temperature, the color of the paint layer is changed to a second color different from the first color. Accordingly, whether or not the plate member is heated or cooled can be easily determined visually.

Further, when the temperature of the plate member is changed by the temperature control means and the temperature of the mounting surface accordingly becomes the second temperature, letters having the second color may appear on the mounting surface with the paint layer. Also in this case, whether or not the plate member is heated or cooled can be easily determined visually.

Further, an additional paint layer may be formed on the paint layer formed on the mounting surface, in which when the temperature of the mounting surface becomes a third temperature different from the first temperature and the second temperature, the color of the additional paint layer is changed to a third color different from the first color and the second color. In this case, a local temperature change on the plate member can be determined visually.

The above and other objects, features, and advantages of the present invention and the manner of realizing them will become more apparent, and the invention itself will best be understood from a study of the following description and appended claims with reference to the attached drawings showing a preferred embodiments of the invention.

DETAILED DESCRIPTION OF THE PREFERRED EMBODIMENTS

First Preferred Embodiment

Figure 1:
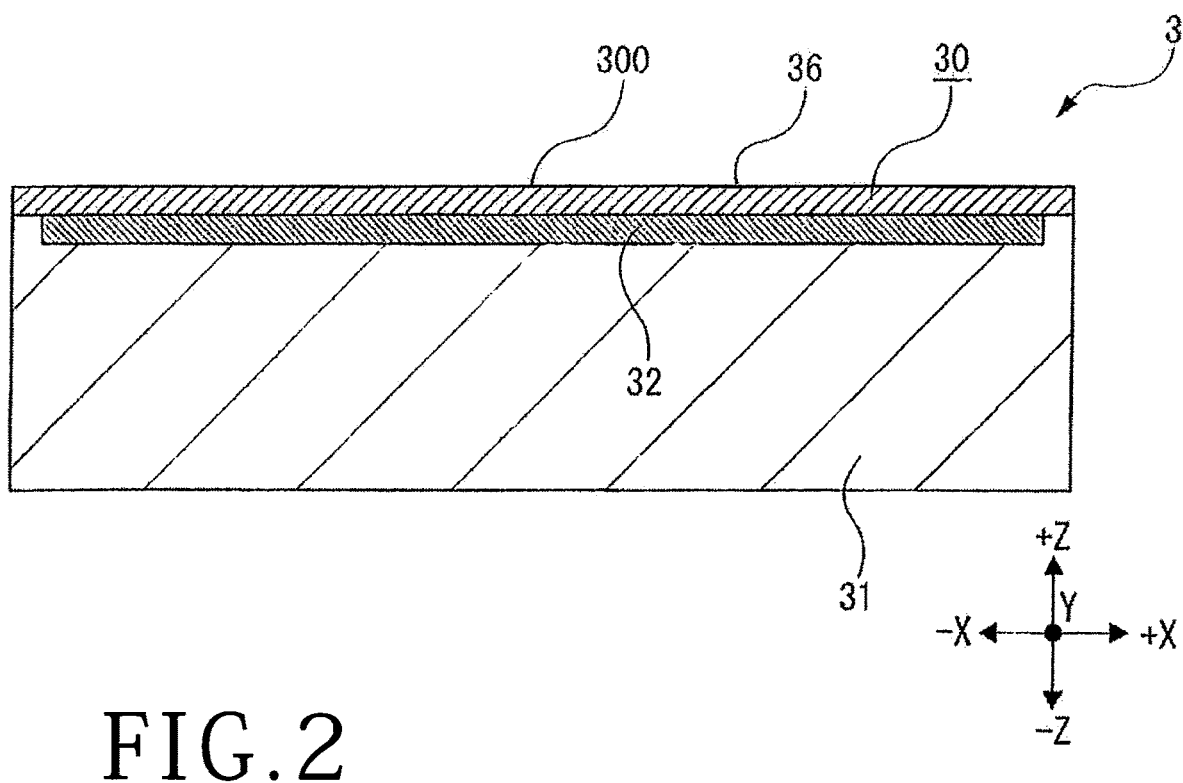
FIG. 1 is a sectional view of a table according to a first preferred embodiment of the present invention in the condition where a plate member included in the table is not heated (i.e., the temperature of the plate member is a first temperature)

Referring to FIG. 1, a table 3 according to a first preferred embodiment of the present invention is depicted in vertical section. The table 3 is a hot plate for heating a plate-shaped workpiece such as a semiconductor wafer or heating a tape attached to the workpiece. The table 3 includes a base 31 having a rectangular shape as viewed in plan, that is, having a shape like a rectangular prism. The upper surface of the base 31 is formed with a rectangular recess, and temperature control means 32 is embedded in this recess. The upper surface of the base 31 is flush with the upper surface of the temperature control means 32.

For example, the temperature control means 32 is a film heater adapted to generate heat by passing a current. However, this configuration is merely illustrative. In other words, the temperature control means 32 may be a carbon heater, ceramic heater, or halogen heater, all of which are adapted to radiate infrared light. A power source (not depicted) is electrically connected to the temperature control means 32, thereby supplying a predetermined electric power to the temperature control means 32. A plate member 30 is provided on the whole of the upper surface of the base 31 so as to fully cover the upper surface of the temperature control means 32.

Accordingly, by supplying a predetermined electric power to the temperature control means 32, the plate member 30 can be heated to a predetermined temperature by the temperature control means 32. The plate member 30 has a mounting surface 300 for mounting a workpiece.

The plate member 30 has a rectangular shape as viewed in plan. The size of the plate member 30 is the same as the size of the base 31 as viewed in plan. The size of the temperature control means 32 is smaller than the size of the base 31 as viewed in plan. Accordingly, the plate member 30 is placed both on the upper surface of the temperature control means 32 and on the upper surface (rectangular ring-shaped surface) of the base 31 as depicted in FIG. 1. The plate member 30 is formed of a predetermined metal such as stainless steel or a predetermined ceramic such as alumina. The plate member 30 has a substantially flat upper surface as the mounting surface 300 for mounting a workpiece.

Figure 2:
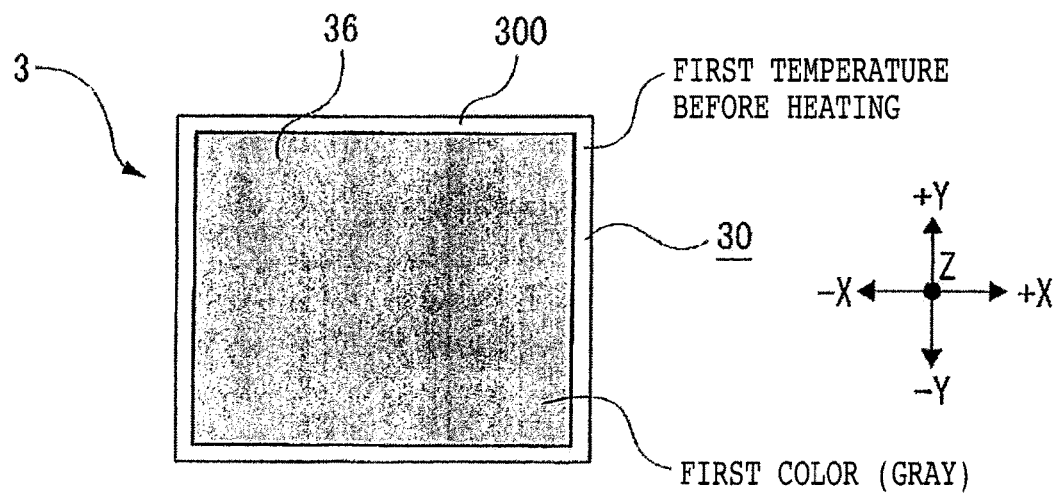
FIG. 2 is a plan view of the table depicted in FIG. 1 in the condition where the plate member is not heated (i.e., the temperature of the plate member is the first temperature)
Figure 3:
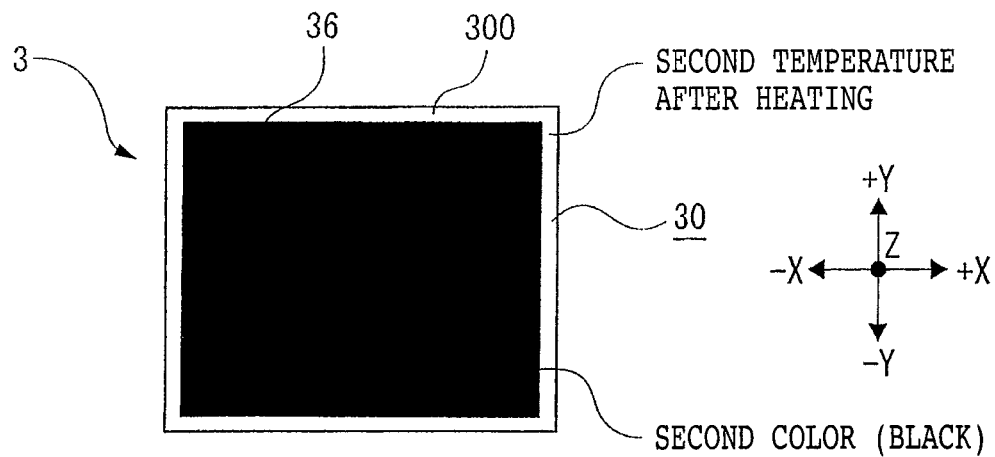
FIG. 3 is a plan view of the table depicted in FIG. 1 in the condition where the plate member is heated (i.e., the temperature of the plate member is a second temperature)

A paint layer 36 having a uniform thickness is formed on the mounting surface 300 of the plate member 30 in a rectangular area just above the temperature control means 32. When the plate member 30 is not heated by the temperature control means 32 and accordingly has a first temperature (e.g., 20° C. as ordinary temperature), the paint layer 36 exhibits a first color (e.g., gray as depicted in FIGS. 1 and 2), whereas when the temperature of the plate member 30 is changed (increased) by the heat from the temperature control means 32 and the temperature of the mounting surface 300 accordingly becomes a second temperature different from (higher than) the first temperature, the color of the paint layer 36 is changed to a second color (e.g., black as depicted in FIG. 3) different from the first color. The upper surface of the paint layer 36 is a flat surface.

As depicted in FIGS. 1 to 3, the paint layer 36 has a rectangular shape as viewed in plan, and the area of the paint layer 36 corresponds to the area of the temperature control means 32. As a modification, the paint layer 36 may be formed on the whole of the upper surface of the mounting surface 300. The first color and the second color of the paint layer 36 are not limited. For example, when the plate member 30 is not heated by the temperature control means 32 and has the first temperature, the paint layer 36 may be colorless, whereas when the plate member 30 is heated by the temperature control means 32 and the temperature of the mounting surface 300 is increased to the second temperature, the paint layer 36 may be colored (e.g., it may become red).

The paint layer 36 is formed of a reversible paint capable of repeating the appearance and disappearance of color according to temperature changes. Further, the paint layer 36 is preferably insoluble in water. At the time the temperature of the plate member 36 has reached the second temperature by the heating of the plate member 30, the color of the paint layer 36 may be suddenly changed from the first color to the second color.

Alternatively, with the temperature change from the first temperature to the second temperature by the heating of the plate member 30, the color of the paint layer 36 may be changed in such a manner that the lightness of the first color (gray) is gradually decreased and the second color (black) is finally given at the time the second temperature is reached.

As described above, the table 3 for heating a workpiece according to this preferred embodiment includes the plate member 30 having the mounting surface 300 for mounting the workpiece and the temperature control means 32 for heating the plate member 30, the paint layer 36 being formed on the mounting surface 300, in which when the plate member 30 is not heated by the temperature control means 32 and accordingly has the first temperature (e.g., 20° C. as ordinary temperature), the paint layer 36 exhibits the first color (e.g., gray) as depicted in FIG. 2, whereas when the temperature of the plate member 30 is increased by the heat from the temperature control means 32 and the temperature of the mounting surface 300 accordingly becomes the second temperature higher than the first temperature, the color of the paint layer 36 is changed to the second color (e.g., black) different from the first color as depicted in FIG. 3. Accordingly, whether or not the plate member 30 is heated can be easily determined visually.

Figure 4:
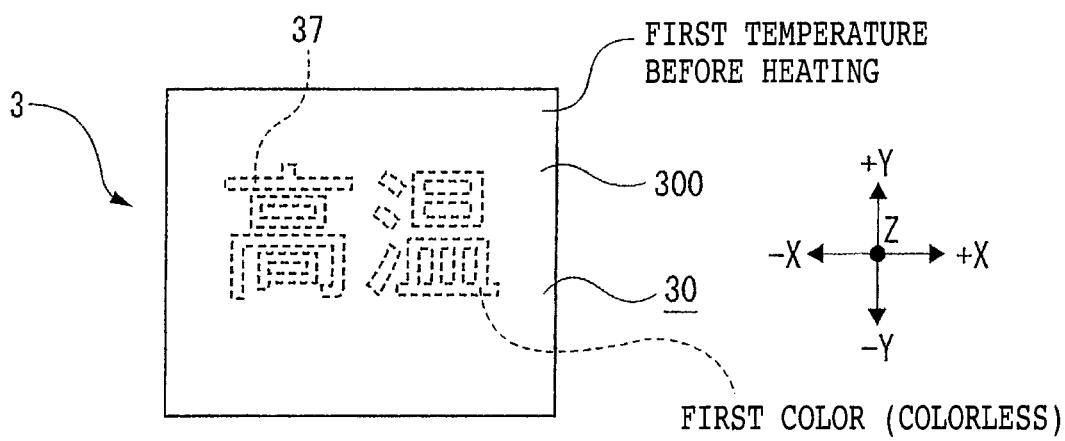
FIG. 4 is a plan view depicting a modification of the table according to the first preferred embodiment in the condition where the plate member is not heated (i.e., the temperature of the plate member is a first temperature)
Figure 5:
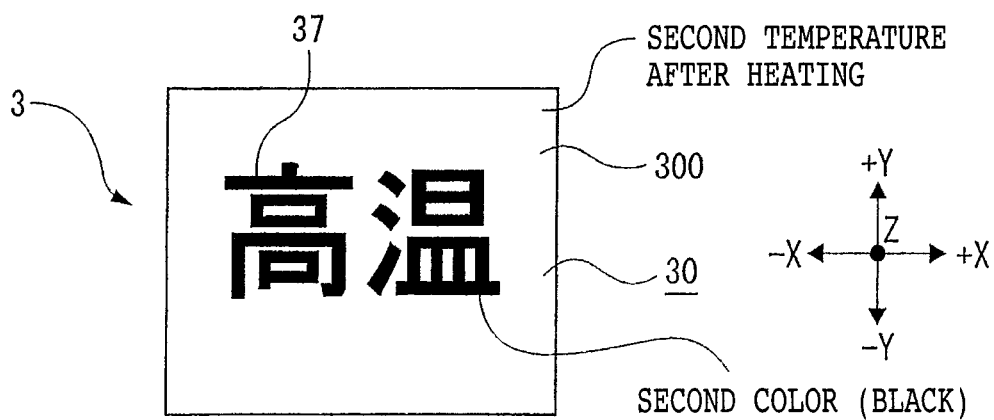
FIG. 5 is a plan view of the table depicted in FIG. 4 in the condition where the plate member is heated (i.e., the temperature of the plate member is a second temperature)

A modification of the table 3 will now be described with reference to FIGS. 4 and 5. As depicted in FIGS. 4 and 5, a paint layer 37 is formed on the mounting surface 300 of the plate member 30, in which letters of "HOT," for example, are written with the paint layer 37. When the plate member 30 is not heated by the temperature control means 32 and the temperature of the plate member 30 is a first temperature, the paint layer 37 exhibits a first color (colorless as depicted by broken lines in FIG. 4), whereas when the temperature of the plate member 30 is changed (increased) by the heat from the temperature control means 32 and the temperature of the mounting surface 300 accordingly becomes a second temperature different from (higher than) the first temperature, the color of the paint layer 37 is changed to a second color (e.g., black as depicted in FIG. 5) different from the first color.

While the letters of "HOT" by the paint layer 37 are largely written at the central area of the mounting surface 300 as depicted in FIGS. 4 and 5, these letters may be written at the four corner areas of the mounting surface 300, for example. Further, the letters of "HOT" may be replaced by letters of "HEATING" written on the mounting surface 300 with the paint layer 37.

As described above, when the temperature of the plate member 30 is changed from the first temperature to the second temperature by the heat from the temperature control means 32, the letters of "HOT" having the second color different from the first color (colorless) appear on the mounting surface 300 with the paint layer 37 according to the modification depicted in FIGS. 4 and 5. Accordingly, whether or not the plate member 30 is heated can be easily determined visually.

Second Preferred Embodiment

Figure 6:
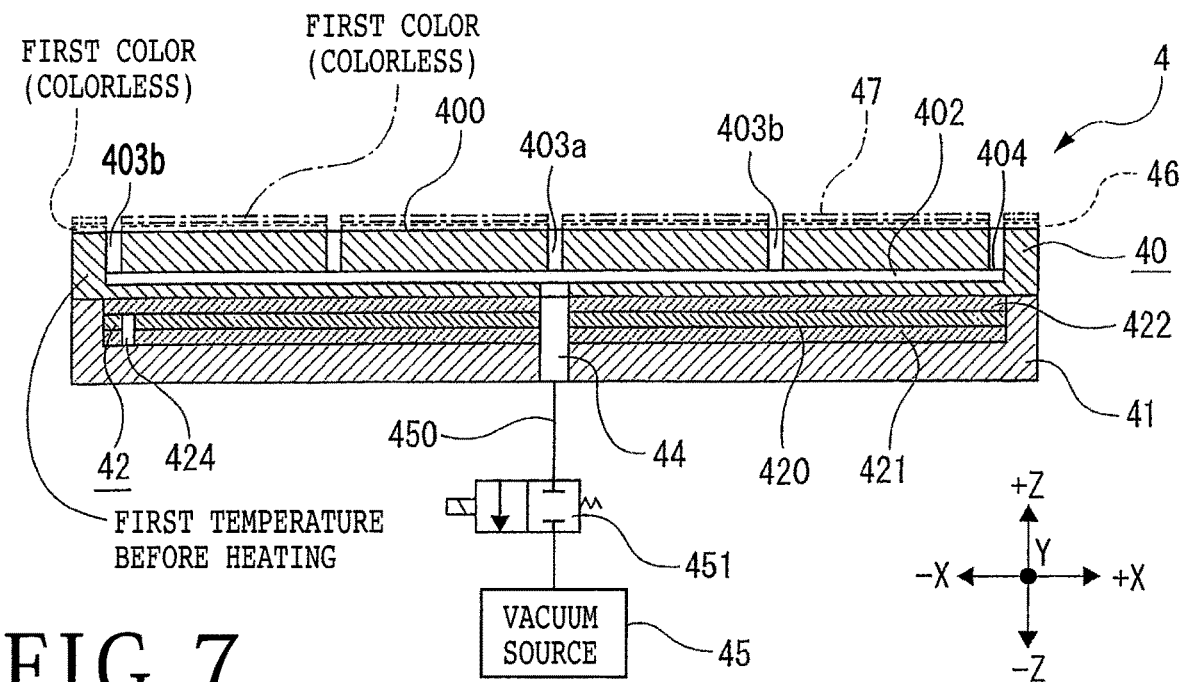
FIG. 6 is a sectional view of a table according to a second preferred embodiment of the present invention in the condition where a plate member included in the table is not heated (i.e, the temperature of the plate member is a first temperature)

Referring next to FIG. 6, a table 4 according to a second preferred embodiment of the present invention is depicted in vertical section. The table 4 is a suction table capable of heating a plate-shaped workpiece such as a semiconductor wafer or heating a tape attached to the workpiece. For example, the table 4 is provided in a tape mounter or a tape peeling apparatus. The table 4 includes a circular plate-shaped base 41. The upper surface of the base 41 is formed with a circular recess, and temperature control means 42 is embedded in this recess. The upper surface (annular surface) of the base 41 is flush with the upper surface of the temperature control means 42.

The temperature control means 42 includes a heat insulator 421 provided on the bottom surface of the recess of the base 41, a heater (film heater) 420 provided on the heat insulator 421 and adapted to generate heat by passing a current, and an aluminum plate 422 provided on the heater 420.

The heat insulator 421 functions to prevent the transmission of heat generated from the heater 420 to the base 41, thereby eliminating an adverse effect of the heat on a base housing or the like where the table 4 is mounted. The aluminum plate 422 as a heat conductor having a high heat conductivity functions to conduct the heat generated from the heater 420 to a plate member 40 provided on the aluminum plate 422, with low loss.

A power source (not depicted) is electrically connected to the heater 420, thereby supplying a predetermined electric power to the heater 420. The plate member 40 is provided on the whole of the upper surface of the base 41 so as to fully cover the upper surface of the temperature control means 42, that is, the upper surface of the aluminum plate 422. Accordingly, by supplying a predetermined electric power to the heater 420, the plate member 40 can be heated to a predetermined temperature by the temperature control means 42. The plate member 40 has a mounting surface 400 for mounting a workpiece. The temperature of the heater 420 can be detected by a thermocouple 424 provided in the recess of the base 41.

A through hole 44 is formed at the center of the temperature control means 42 and at the center of the base 41 so as to extend from the upper surface of the temperature control means 42 to the lower surface of the base 41 in the Z direction depicted by an arrow Z in FIG. 6. The lower end of the through hole 44 is connected through a suction passage 450 and a solenoid valve 451 to a vacuum source 45 such as a vacuum generating apparatus. The solenoid valve 451 is provided on the suction passage 450.

The plate member 40 has a circular shape as viewed in plan, for example. The size of the plate member 40 is the same as the size of the base 41 as viewed in plan. The size of the temperature control means 42 is smaller than the size of the base 41 as viewed in plan. Accordingly, the plate member 40 is placed both on the upper surface of the temperature control means 42 and on the upper surface (annular surface) of the base 41 as depicted in FIG. 6. The plate member 40 is formed of a predetermined metal such as stainless steel or a predetermined ceramic such as alumina. The plate member 40 has a substantially flat upper surface as the mounting surface 400 for mounting a plate-shaped workpiece such as a semiconductor wafer.

Figure 7:
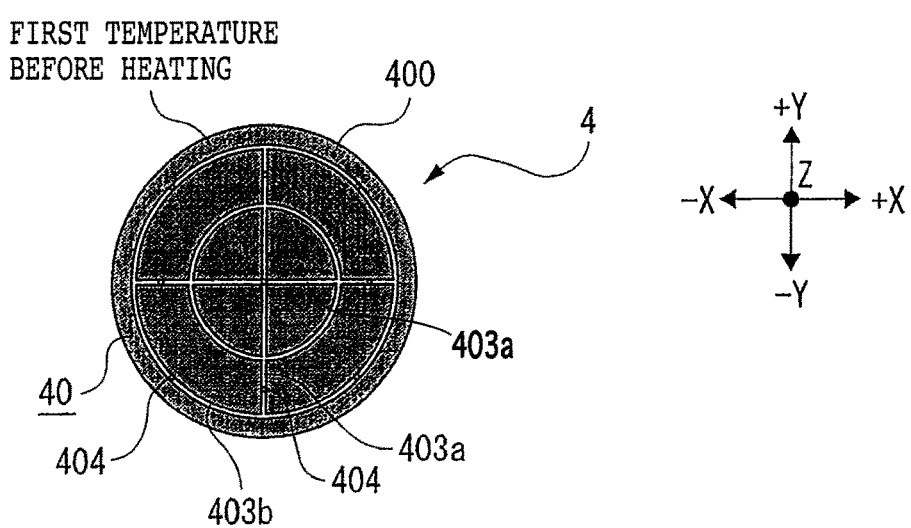
FIG. 7 is a plan view of the table depicted in FIG. 6 in the condition where the plate member is not heated (i.e., the temperature of the plate member is the first temperature)

A suction space 402 is defined inside the plate member 40, and the upper end of the through hole 44 is connected to the suction space 402. As depicted in FIG. 7, the mounting surface 400 of the plate member 40 has four linear suction grooves 403a extending radially outward from the center of the mounting surface 400 and two annular suction grooves 403b concentrically formed about the center of the mounting surface 400. The bottoms of the linear suction grooves 403a and the bottoms of the annular suction grooves 403b are formed with a plurality of suction holes 404, which are connected to the suction space 402 depicted in FIG. 6.

When the vacuum source 45 is operated in the condition where the solenoid valve 451 is open, a suction force produced by the vacuum source 45 is transmitted through the suction passage 450, the through hole 44, the suction space 402, the suction holes 404, and the suction grooves 403a and 403b to the mounting surface 400. As described later, a first paint layer 46 and a second paint layer 47 are formed on the mounting surface 400 except the upper openings of the suction grooves 403a and 403b. Accordingly, the workpiece placed on the mounting surface 400 can be held under suction on the mounting surface 400 through the first paint layer 46 and the second paint layer 47.

As depicted in FIG. 6, the first paint layer 46 having a uniform thickness is formed on the mounting surface 400 of the plate member 40 except the upper openings of the suction grooves 403a and 403b. The first paint layer 46 is depicted by a broken line in FIG. 6. When the plate member 40 is not heated by the temperature control means 42 and accordingly has a first temperature (e.g., 20° C. as ordinary temperature), the first paint layer 46 exhibits a first color (colorless as depicted in FIG. 6).

Further, the second paint layer 47 having a uniform thickness is formed on the first paint layer 46 except the upper openings of the suction grooves 403a and 403b. The second paint layer 47 is depicted by a short dot and dash line in FIG. 6. When the plate member 40 is not heated by the temperature control means 42 and accordingly has the above first temperature, the second paint layer 47 also exhibits the first color (colorless as depicted in FIG. 6). Accordingly, in the condition where the plate member 40 is not heated by the temperature control means 42 as depicted in FIGS. 6 and 7, the color of the plate member 40 itself (e.g., gray as depicted in FIG. 7) can be visually recognized through the first paint layer 46 and the second paint layer 47 which are colorless at the first temperature.

Figure 8:
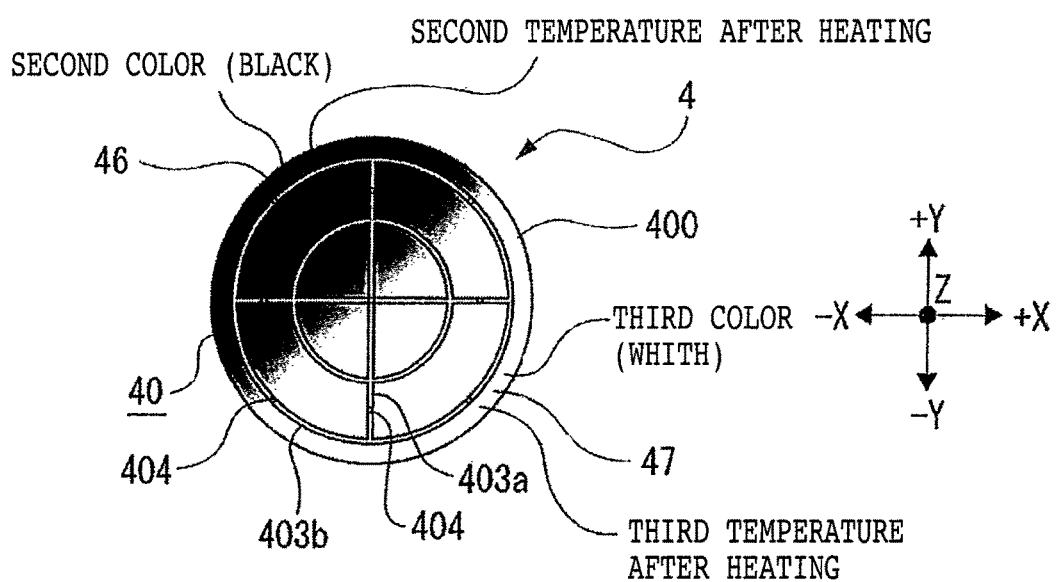
FIG. 8 is a plan view of the table depicted in FIG. 6 in the condition where the plate member is heated (i.e., the temperature of the plate member is a second temperature in one area and a third temperature in another area)

For example, when the plate member 40 is heated by the temperature control means 42, that is, when the temperature of the plate member 40 is changed (increased) by the heat from the temperature control means 42 and the temperature of the mounting surface 400 becomes a second temperature different from (higher than) the first temperature, the color of the first paint layer 46 is changed to a second color (e.g., black as depicted in FIG. 8) different from the first color (colorless). In FIG. 8, a left upper area of the mounting surface 400 has the second temperature, and the first paint layer 46 colored in black can be visually recognized.

In other words, even when the temperature of the mounting surface 400 becomes the second temperature, the color of the second paint layer 47 is not changed, that is, remains colorless. Accordingly, the first paint layer 46 colored in black can be seen through the second paint layer 47 at the second temperature. When the plate member 40 is further heated and the temperature of the mounting surface 400 becomes a third temperature different from the first temperature and the second temperature (the third temperature being higher than the second temperature in this case), the color of the second paint layer 47 is changed to a third color (e.g., white as depicted in FIG. 8) different from the first color (colorless) and the second color (black). In FIG. 8, a right lower area of the mounting surface 400 has the third temperature, and the second paint layer 47 colored in white can be visually recognized.

The first color (colorless), the second color (black), and the third color (white) are merely illustrative. Further, both the first paint layer 46 and the second paint layer 47 are formed of a reversible paint capable of repeating the appearance and disappearance of color according to temperature changes. Further, both the first paint layer 46 and the second paint layer 47 are preferably insoluble in water.

As a modification, an additional paint layer may be formed on the second paint layer 47. In this case, when the temperature of the mounting surface 400 becomes a fourth temperature different from the first temperature, the second temperature, and the third temperature, the color of the additional paint layer is changed to a fourth color (e.g., red) different from the first color (colorless), the second color (black), and the third color (white).

As described above, the table 4 for heating a workpiece according to this preferred embodiment includes the plate member 40 having the mounting surface 400 for mounting the workpiece and the temperature control means 42 for heating the plate member 40, the first paint layer 46 being formed on the mounting surface 400, in which when the plate member 40 is not heated by the temperature control means 42 and accordingly has the first temperature (e.g., 20° C. as ordinary temperature), the first paint layer 46 exhibits the first color (e.g., colorless) as depicted in FIG. 7, whereas when the temperature of the plate member 40 is increased by the heat from the temperature control means 42 and the temperature of the mounting surface 400 accordingly becomes the second temperature higher than the first temperature, the color of the first paint layer 46 is changed to the second color (e.g., black) different from the first color as depicted in FIG. 8. Accordingly, whether or not the plate member 40 is heated can be easily determined visually.

Further, according to this preferred embodiment, the second paint layer 47 is formed on the first paint layer 46, in which when the temperature of the mounting surface 400 is further increased to the third temperature higher than the second temperature, the color of the second paint layer 47 is changed to the third color (e.g., white) different from the first color (colorless) and the second color (black). Accordingly, a local temperature change on the plate member 40 can be determined visually.

For example, in the case that the workpiece held on the table 4 must be processed as being heated to the third temperature, the workpiece cannot be properly processed in the condition where the temperature of the plate member 40 is locally raised to the third temperature as depicted in FIG. 8. Accordingly, in this case, the plate member 40 is further heated by the temperature control means 42 until the temperature of the whole of the mounting surface 400 becomes the third temperature and accordingly the color of the whole of the second paint layer 47 becomes white. Thereafter, the workpiece is placed on the mounting surface 400 to perform the processing.

Further, in the case that the thermocouple 424 indicates a low temperature (e.g., the first temperature) and the first paint layer 46 or the second paint layer 47 is changed in color as depicted in FIG. 8, it is assumed that the thermocouple 424 has any trouble such as failure and disconnection. Accordingly, overheating of the plate member 40 by the temperature control means 42 can be prevented.

Third Preferred Embodiment

Figure 9:
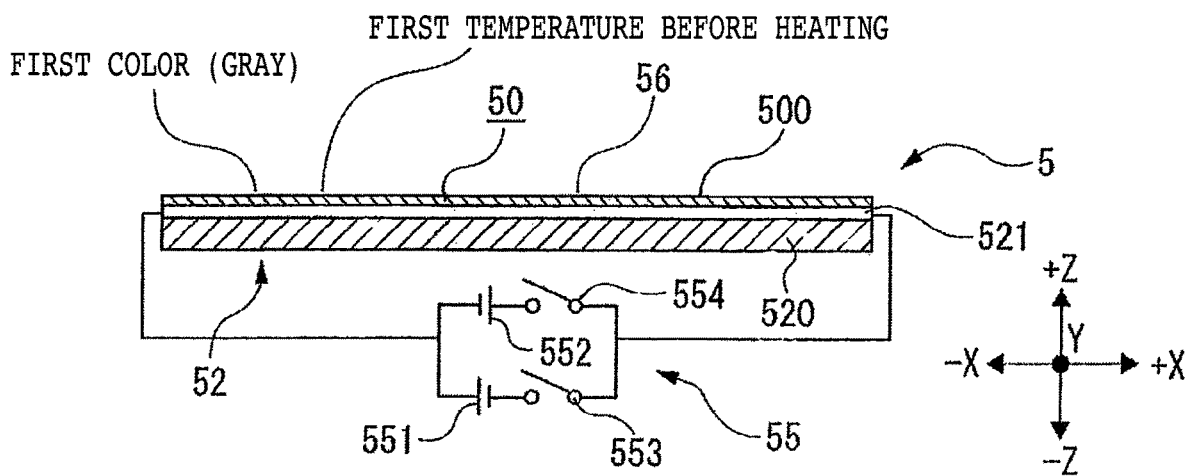
FIG. 9 is a sectional view of a table according to a third preferred embodiment of the present invention in the condition where a plate member included in the table is not cooled (i.e., the temperature of the plate member is a first temperature)

Referring next to FIG. 9, a table 5 according to a third preferred embodiment of the present invention is depicted in vertical section. The table 5 is a cooling table for cooling a plate-shaped workpiece such as a semiconductor wafer or cooling a tape attached to the workpiece. For example, the table 5 is provided in a tape mounter, a tape peeling apparatus, or a tape expander for expanding the tape attached to the workpiece to thereby divide the workpiece into chips. The table 5 includes a plate member 50 and temperature control means 52 for cooling the plate member 50, in which the plate member 50 has a mounting surface 500 for mounting a workpiece.

The temperature control means 52 includes a circular heat radiation plate 520 formed of metal such as aluminum and a Peltier device layer 521 provided on the heat radiation plate 520. The temperature control means 52 functions to absorb the heat from the plate member 50, thereby cooling the plate member 50. The Peltier device layer 521 is a plate-shaped device layer formed by alternately arranging p-type semiconductors and n-type semiconductors and connecting the p-type semiconductors and the n-type semiconductors through copper electrodes. The Peltier device layer 521 has an upper heat absorption surface and a lower heat radiation surface, in which the upper heat absorption surface is in contact with the plate member 50 through a heat conductor such as ceramic, and the lower heat radiation surface is in contact with the heat radiation plate 520 through a heat conductor such as ceramic. The heat generated from the heat radiation surface of the Peltier device layer 521 is dissipated from the heat radiation plate 520 so as not to have an influence on the cooling process for the workpiece.

Power supplying means 55 is electrically connected to the Peltier device layer 521. The power supplying means 55 can change the direction of a direct current to be input into the Peltier device layer 521. The power supplying means 55 includes a first direct current (DC) power supply 551 and a switch 553 for the first DC power supply 551 and further includes a second DC power supply 552 and a switch 554 for the second DC power supply 552, in which the positive electrode and the negative electrode of the second DC power supply 552 are opposite in position to those of the first DC power supply 551.

The plate member 50 has a circular shape as viewed in plan. The plate member 50 is formed of a predetermined metal such as stainless steel or a predetermined ceramic such as alumina. The plate member 50 has a substantially flat upper surface as the mounting surface 500 for mounting a workpiece. A paint layer 56 having a uniform thickness is formed on the mounting surface 500 of the plate member 50. When the plate member 50 is not cooled by the temperature control means 52 and accordingly has a first temperature (e.g., 20° C. as ordinary temperature), the paint layer 56 exhibits a first color (e.g., gray as depicted in FIG. 9). The paint layer 56 has a flat upper surface.

Figure 10:
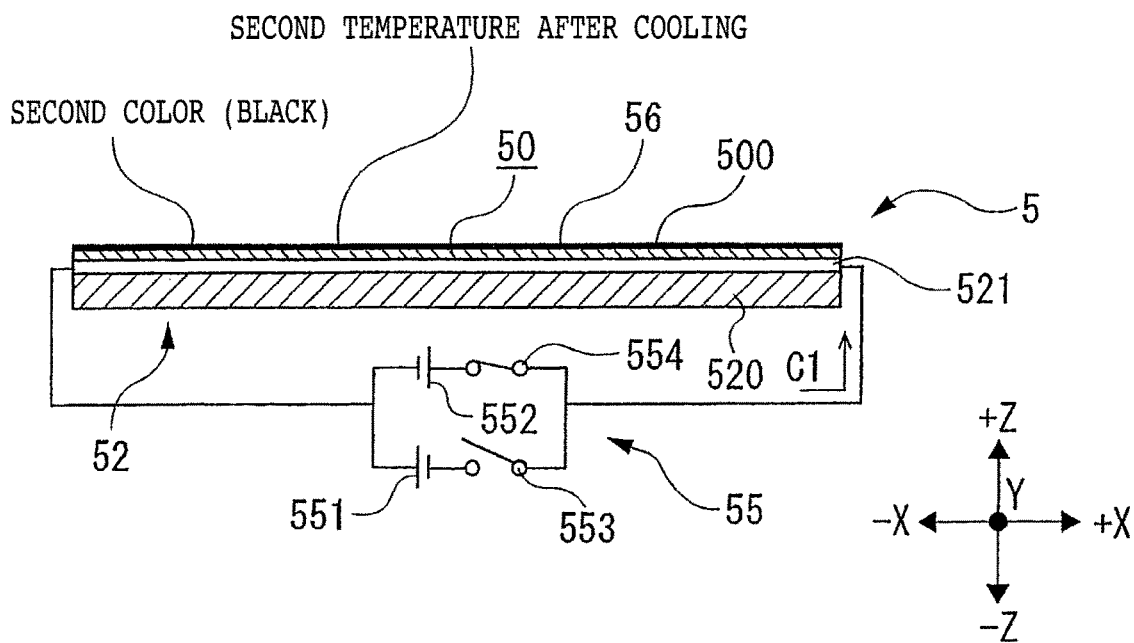
FIG. 10 is a sectional view of the table depicted in FIG. 9 in the condition where the plate member is cooled (i.e., the temperature of the plate member is a second temperature)

When the switch 554 for the second DC power supply 552 is closed to pass a direct current in the direction depicted by an arrow C1 in FIG. 10, the direct current is passed through the Peltier device layer 521 from the n-type semiconductor. As a result, a temperature difference is produced between the upper heat absorption surface and the lower heat radiation surface of the Peltier device layer 521 depicted in FIG. 10. Accordingly, the heat of the plate member 50 is absorbed by the heat absorption surface having a low temperature and then carried to the heat radiation surface. The heat carried to the heat radiation surface is then sufficiently radiated by the heat radiation plate 520. Accordingly, the heat absorption operation mentioned above is continuously performed by the temperature control means 52 to thereby cool the plate member 50.

When the temperature of the plate member 50 is changed (decreased) by the above cooling operation of the temperature control means 52 and accordingly the temperature of the mounting surface 500 becomes a second temperature lower than the first temperature, the color of the paint layer 56 is changed to a second color (e.g., black as depicted in FIG. 10) different from the first color (gray). Accordingly, whether or not the plate member 50 is cooled can be easily determined visually.

Figure 11:
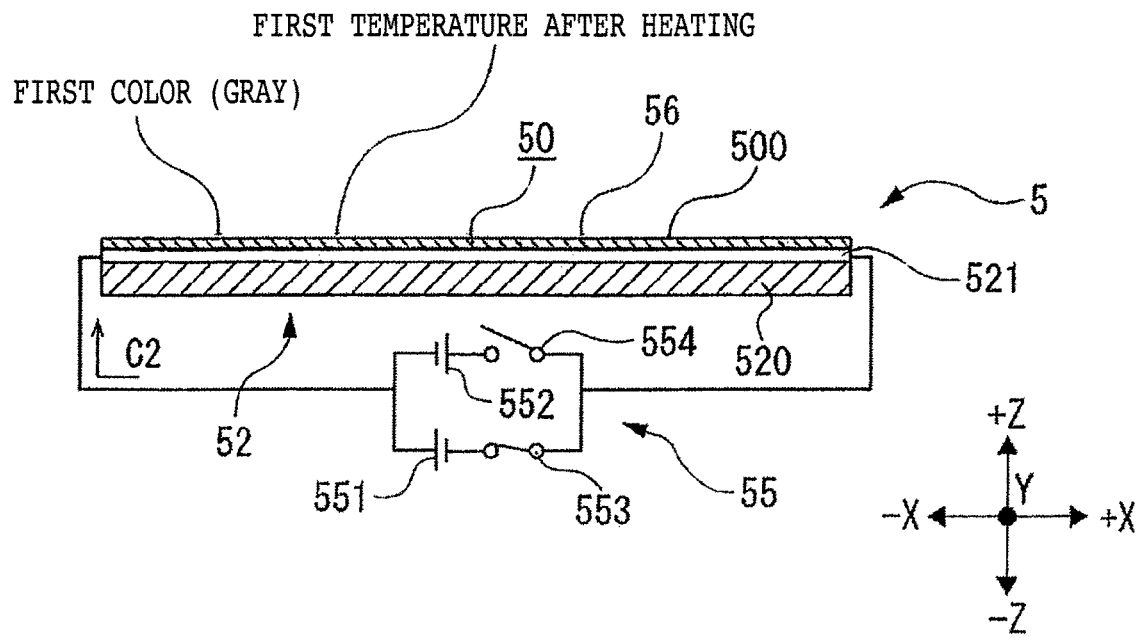
FIG. 11 is a sectional view of the table depicted in FIG. 10 in the condition where the temperature of the plate member is returned from the second temperature to the first temperature by heating.

In the case that the cooling of the plate member 50 is stopped to return the temperature of the plate member 50 from the second temperature to the first temperature by heating, the switch 554 for the second DC power supply 552 is opened and the switch 553 for the first DC power supply 551 is closed as depicted in FIG. 11. As a result, a direct current is passed in the direction depicted by an arrow C2 in FIG. 11. In other words, the polarity of the direct current passed through the Peltier device layer 521 is changed, so that heat is continuously applied from the upper heat absorption surface of the Peltier device layer 521 to the plate member 50 and the temperature of the plate member 50 is returned to the first temperature. Accordingly, the color of the paint layer 56 is returned from the second color (black) to the first color (gray).

The first color and the second color of the paint layer 56 are merely illustrative. Further, the paint layer 56 is formed of a reversible paint capable of repeating the appearance and disappearance of color according to temperature changes. Further, the paint layer 56 is preferably insoluble in water.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A table for heating or cooling a workpiece, comprising:
a plate member having a mounting surface for mounting said workpiece;
temperature control means heating or cooling said plate member;
a first paint layer being formed on said mounting surface of said plate member; and
a second paint layer formed on said first paint layer;
wherein when said plate member is not heated or cooled by said temperature control means and accordingly has a first temperature, said first paint layer exhibits a first color, whereas when a temperature of said plate member is changed by said temperature control means and the temperature of said mounting surface accordingly becomes a second temperature different from said first temperature, a color of said first paint layer is changed to a second color different from said first color and visible through the second paint layer, and
when the temperature of said mounting surface becomes a third temperature different from said first temperature and said second temperature, a color of said second paint layer is changed to a third color different from said first color and said second color and visibly blocks said color of said first paint layer.

2. The table according to claim 1, wherein
when the temperature of said plate member is changed by said temperature control means and a temperature of said mounting surface accordingly becomes said second temperature, letters having said second color appear on said mounting surface with said first paint layer.

* * * * *